July 3, 1951  A. R. A. BEEBER ET AL  2,559,389
METHOD OF PRODUCING PRECISION IMAGES
Original Filed April 2, 1942  6 Sheets-Sheet 1
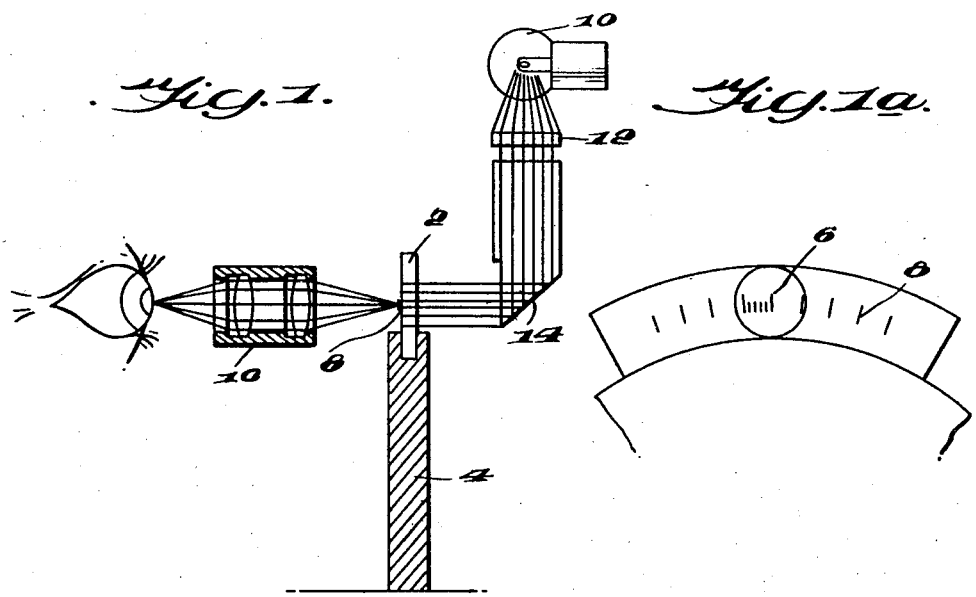
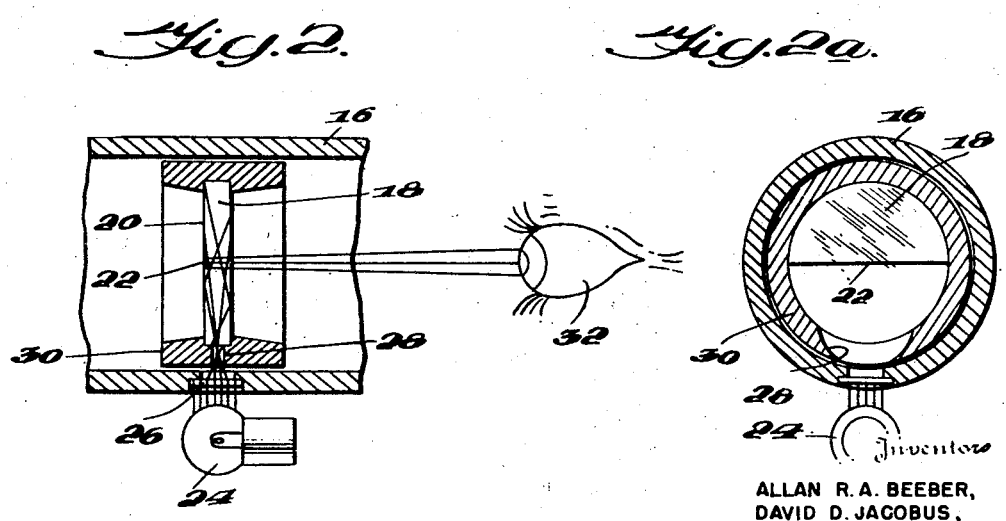
ALLAN R. A. BEEBER,
DAVID D. JACOBUS,
CARL W. KEUFFEL, July 3, 1951 A. R. A. BEEBER ET AL 2,559,389
METHOD OF PRODUCING PRECISION IMAGES
Original Filed April 2, 1942 6 Sheets-Sheet 2
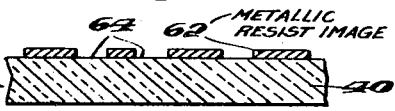
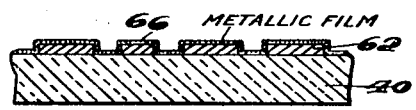
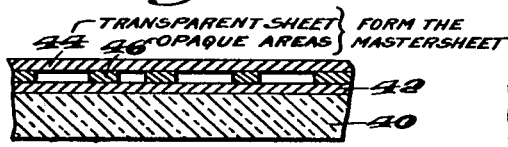
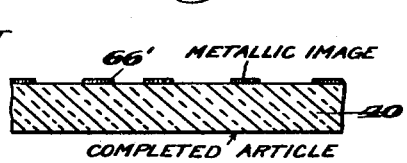
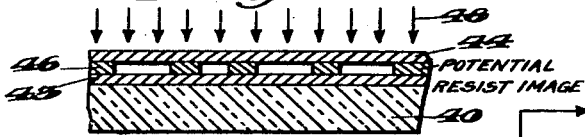
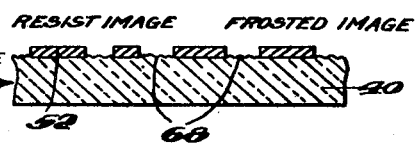
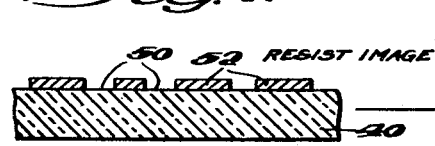
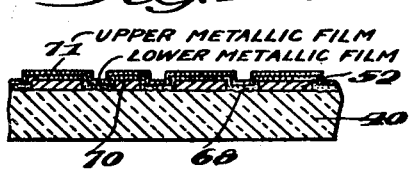
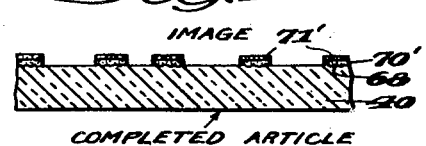
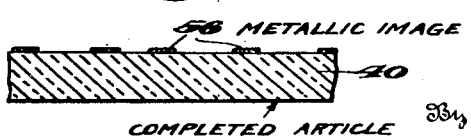
Inventors
ALLAN R. A. BEEBER,
DAVID D. JACOBUS,
CARL W. KEUFFEL,
By J. Russell Juten
Attorney Inventors
ALLAN R.A. BEEBER,
DAVID D. JACOBUS,
CARL W. KEUFFEL,
By J. Russell Juten
Attorney July 3, 1951 — A. R. A. BEEBER ET AL — 2,559,389
METHOD OF PRODUCING PRECISION IMAGES
Original Filed April 2, 1942 — 6 Sheets-Sheet 5

Inventors
ALLAN R.A. BEEBER,
DAVID D. JACOBUS,
CARL W. KEUFFEL,
By J. Russell Juten
Attorney July 3, 1951 A. R. A. BEEBER ET AL 2,559,389
METHOD OF PRODUCING PRECISION IMAGES
Original Filed April 2, 1942 6 Sheets-Sheet 6
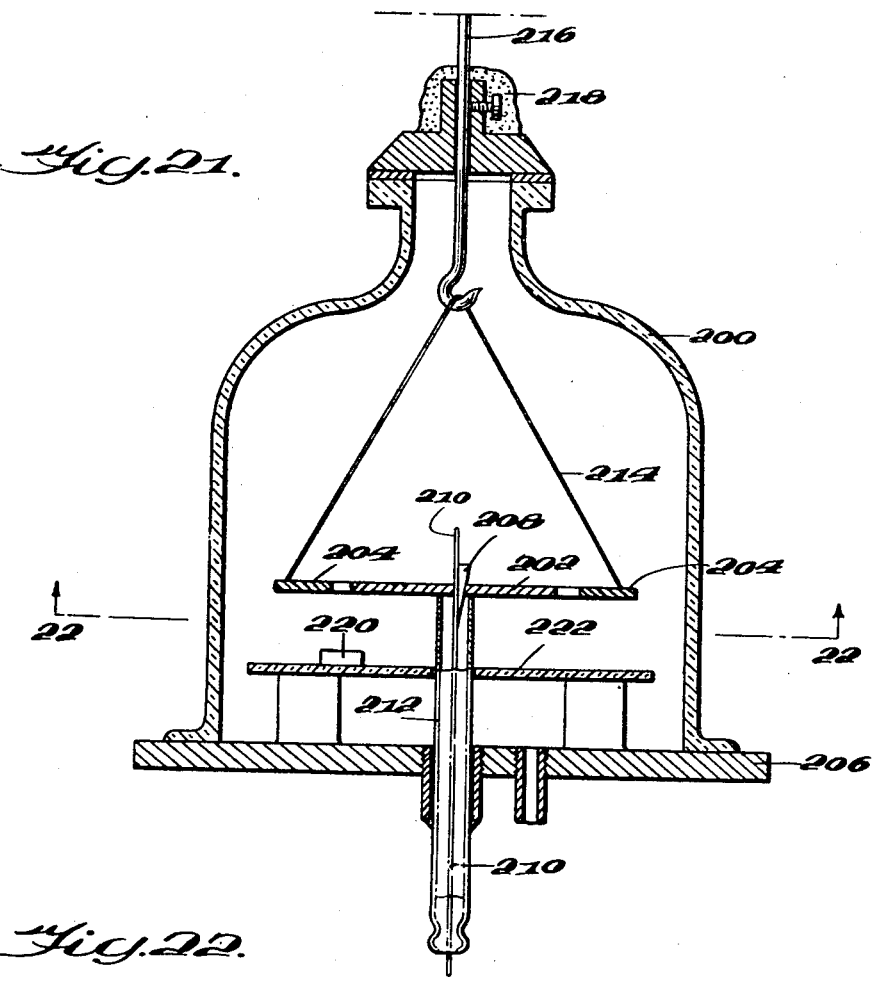
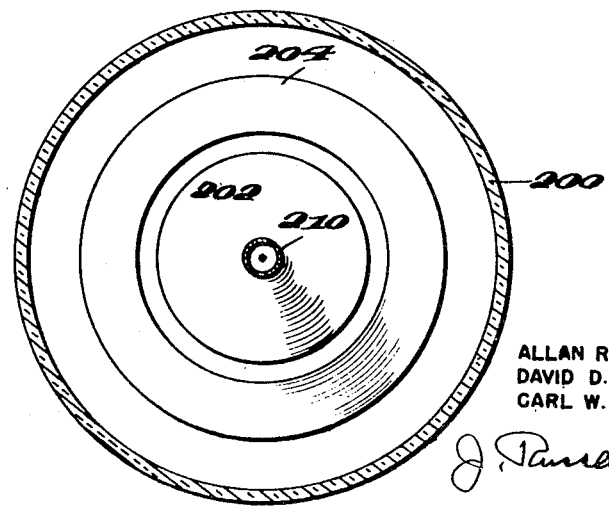
Inventors
ALLAN R. A. BEEBER,
DAVID D. JACOBUS,
CARL W. KEUFFEL,
Attorney Patented July 3, 1951

2,559,389

UNITED STATES PATENT OFFICE 2,559,389

METHOD OF PRODUCING PRECISION IMAGES

Allan R. A. Beeber, Matawan, David D. Jacobus, Hoboken, and Carl W. Keuffel, Bernardsville, N. J., assignors to Keuffel & Esser Company, Hoboken, N. J., a corporation of New Jersey Original application April 2, 1942, Serial No. 437,438. Divided and this application December 24, 1947, Serial No. 793,646

20 Claims. (Cl. 41—43)

This invention relates to precision images on suitable bases, usually, though not necessarily, transparent, and to the methods for producing such precision images. This is a division of Patent No. 2,447,836.

Although of general utility, this invention is particularly applicable to precision images either for scales or reticules and usually is employed in optical systems in which unusually high degrees of accuracy are required.

Precision scales are required in many different fields. For example, in an instrument such as a transit provided with a horizontal and vertical graduated limb the limitations in size of the instrument require that the limb be of relatively small diameter yet extreme precision is necessary for the markings and graduations thereon. Such graduated members may require illumination only from the top and therefore the graduations can be applied on metal. In other instruments it may be desirable to have the graduations or markings on a transparent or translucent member in which case the markings are visible when illuminated from the front or when illuminated from the back. In still other cases as in reticule markings, illumination may be by light transmitted through the optical system of the instrument or by light directed transversely of the reticule element.

Obviously the degree of accuracy required in various fields such as these may vary from accuracies in thousandths of an inch to accuracies as high as or higher than hundred thousandths of an inch, the latter being true in the case of elements forming part of the optical system of optical military instruments especially those for fire control.

In the past, scales have been applied to metallic surfaces by mechanically engraving a prepared metallic surface and filling the depression formed by the engraving with a contrasting material, broadly termed an ink. Markings have also been made on glass surfaces by providing a protecting layer over the prepared surface which might be, for example, a wax. This wax surface was engraved by special pantograph engraving machines whereby a large master produced a reduced image by removing the resist from certain areas of the glass. When the exposed areas were subjected to the action of an etching solution, i. e. hydrofluoric acid, the glass was etched away to form a depression which was filled with the opaque ink.

The methods of the prior art for forming devices of this type were subject to many limitations as to accuracy; difficulty was experienced in accurately repeating an operation so that successively produced scales, reticules, etc., were identical and, furthermore, the exact form of the markings was not as accurate as might be desired for many purposes because of the difficulty of obtaining sharply defined edges, the reason for which will be explained herebelow.

According to the present invention, precision images of great accuracy, as well as durability, are made. They may be made with considerable rapidity, with no sacrifice of accuracy. Precision patterns and images identical in every detail may be produced in substantial quantities.

In its broader aspects, the invention comprises the following steps:

1. Applying a resist to a prepared base.
2. Removing portions of the resist to expose the surface of the base, such exposed areas forming with the resist, a resist image according to a predetermined pattern.
3. Covering the resist image with an opaque film.
4. Selectively removing the resist and its overlying film, but leaving those portions of the opaque film which are directly applied to the base, to define a precision image or pattern on such base.

To explain the steps in more detail:

In the first step, the preferred base is of glass, such as optical glass having an accurate plane surface. However, other suitable materials for the base may be used. The resist is preferably a film of organic material, soluble in suitable solvents, although the resist could be a film of metal, soluble in certain acids.

In the second step, where the resist is of metal or of an organic material which is not photosensitive, the resist is removed by mechanical engraving, to expose the base in areas defining the pattern in clear glass. However, the preferred resist is photo-sensitive, and in this case, the resist is exposed to light by contact printing through a master pattern, subsequent development exposing the base in areas defining the pattern in clear glass.

In the third step, the base, having a resist image in clear glass thereon, is covered by an opaque film of one or more metals, by molecular deposition in vacuum, the metal being sputtered or evaporated onto the glass article, as will be described in detail below.

In the fourth step, the surface of the base is treated with a selected solvent, which removes the remainder of the resist, together with its overlaying metallic layer, but does not remove those portions of the metallic film adhering directly to the base, which adhering portions serve to define the desired precision image.

A very important feature of the present invention is an additional step, whereby a precision pattern is produced which glows under transverse illumination, as in a reticule. This additional step comprises subjecting the resist image of the second step, wherein the pattern is defined in clear glass, to a frosting step, wherein the resist image is frosted, which may be considered as a microscopic pitting of the glass surface. After the frosting step, the third and fourth steps are proceeded with.

The objects, features and advantages of this invention and the means for their attainment will be better understood by reference to the drawings forming part of this specification in which:

Fig. 1 is a diagrammatic sectional view showing one method of use of the article of the present invention.

Fig. 1a is a front view of the precision image of Fig. 1.

Fig. 2 is a diagrammatic sectional view showing a precision image viewed by transverse illumination.

Fig. 2a is a front view of the image of Fig. 2.

Figs. 3-15 inclusive, are diagrammatic views in section illustrating successive steps involved in several methods of the present invention.

Figure 16:
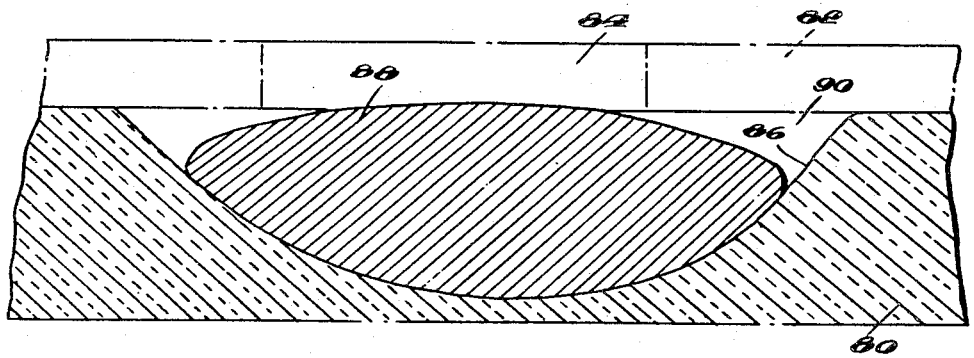

Fig. 16 is a sectional, greatly enlarged, diagrammatic view of an image formed as the result of an etching operation.

Figure 17:
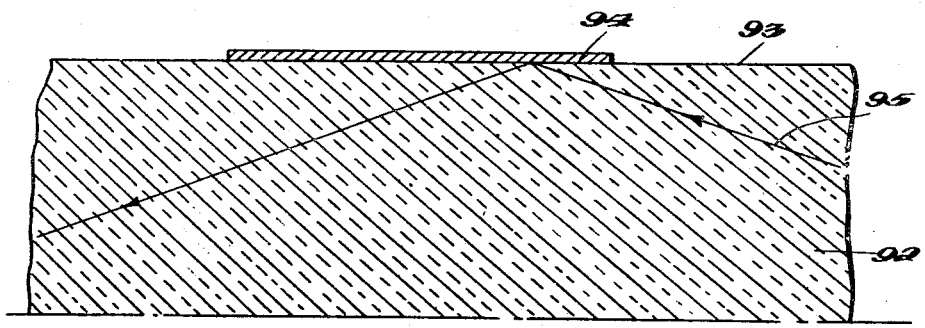

Fig. 17 is a sectional, greatly enlarged, diagrammatic view of one type of precision image according to the present invention.

Figure 18:
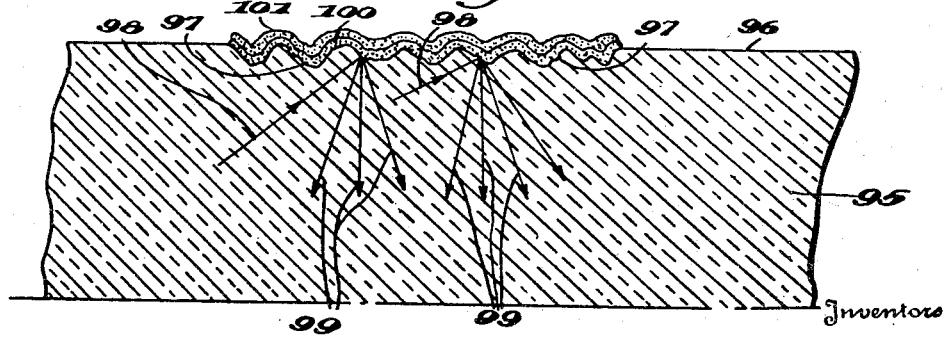

Fig. 18 is a sectional, greatly enlarged, diagrammatic view of a precision image according to the present invention, involving the frosting of the base.

Figure 19:
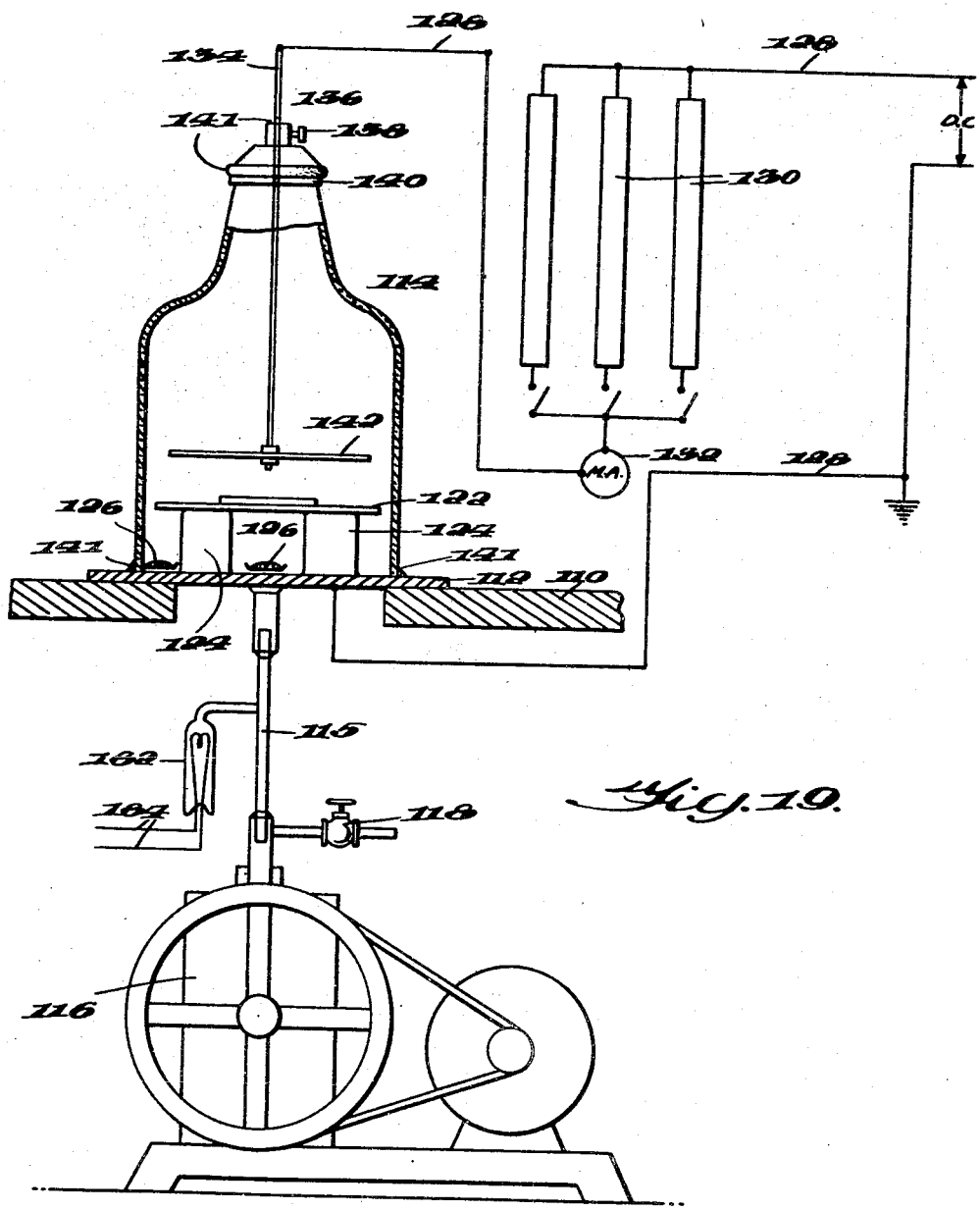

Fig. 19 is a side view, partly in section, of one type of apparatus used.

Figure 20:
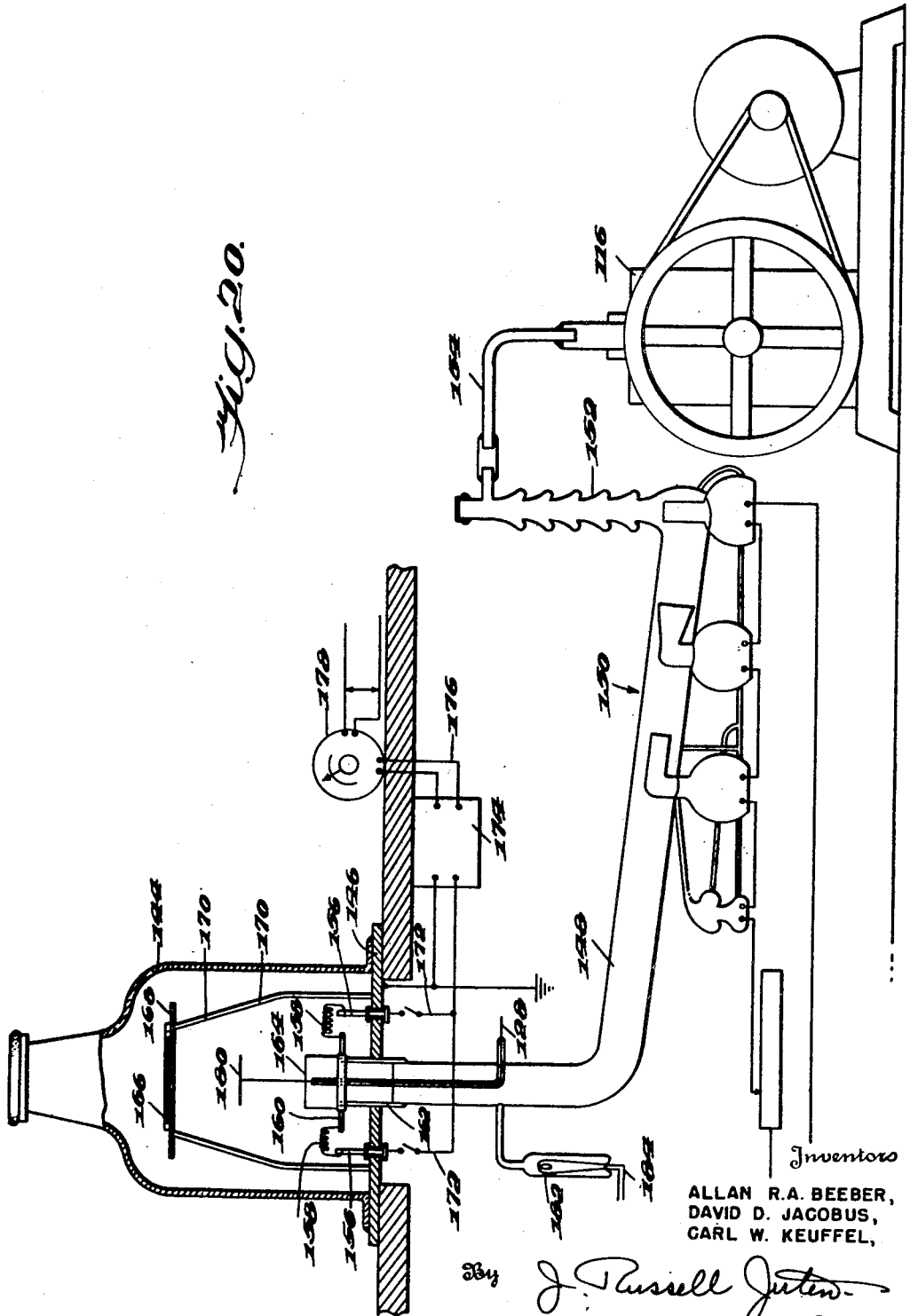

Fig. 20 is a side view, partly in section, of another type of apparatus used.

Fig. 21 is a side view, partly in section, of still another type of apparatus used; and Fig. 22 is a section on line 22—22 of Fig. 21.

The features of this invention are applicable to devices having dials or scales such as are illustrated in Figure 1. The scale 2 is suitably supported or may be unitary with member 4 movable according to varying conditions with reference to an indicator mark 6. The markings 8 of the scale are viewed, for example, through a suitable eyepiece 10. Where the scale 2 is transparent and the markings 8 are opaque, the scale is most conveniently illuminated from the rear as by a bulb 10, the rays of which are directed toward the scale by a collecting lens 12 and reflector 14. Obviously, any other means for illumination by transmitted light could be used in similar arrangements.

The invention is also applicable for markings on optical elements as illustrated in Figure 2. In this case a tubular member 16 of, for example, a telescope has mounted therein a lens member 18 which may be a reticule, one face 20 of which is in a focal plane. The lens member may carry a reticule marking 22 which, as will be more readily understood from other figures (Fig. 18) hereinafter described, is in or below the face 20 of the lens member 18. A bulb 24 is arranged so that light rays therefrom will pass through a window opening 26 in the tubular member 16 and through a cut-out portion 28 in the lens mount 30. Rays of light from the bulb 24 enter the polished periphery of the lens member 18 in directions making acute angles with the face 20 of the lens member 18 from which face the rays are reflected without emerging from the lens element. Certain of these rays will impinge upon the reticule marking 22 which, being of such a character as to disperse the rays, does so in all directions including directly to the rear, thereby forming an illuminated area visible to an observing eye 32.

The devices illustrated generally in Figures 1 and 2 are exemplary of the uses to which articles manufactured according to this invention may be put. It will be evident from a review of the description of the products produced according to the teachings of this invention that these articles are of general utility in many fields.

The process is applicable to various materials. The blank 40 shown in Figure 3 may be of any suitable material such as glass, quartz, metals, refractory materials, resins as, for example, Bakelite, which may be either transparent or opaque, hard rubber and others. Materials of this type form the base and the selection of the material depends upon the use for which the article is being prepared. In the description hereafter, it will be assumed that the blank is a base of glass but no limitations should be imposed because of the specific description applied to this one form of material.

Heretofore it has been customary where scales of great accuracy or reticules are to be made, to make the blanks in the same manner as any optical element is made; that is, a piece of proper shape is ground and polished according to predetermined characteristics. For ordinary scales, the glass blank may be a sheet with polished, substantially parallel faces. For reticules, the glass blank may be and usually is a lens element having one flat surface which will be put in the focal plane and another surface having predetermined optical characteristics. These blanks having been prepared as optical elements have required a great deal of very highly skilled work and it is extremely important that in the application of markings for scales or reticules that the blank be not damaged either by making articles which must be rejected or by having to destroy any article in which any inaccuracy has resulted during any step of the process.

This invention permits the use of procedures which automatically insure higher degrees of accuracy and in certain steps of the process, if any inaccuracies have arisen, the blank may be salvaged and is not lost.

To operate according to this process the base 40 is coated with a resist 42 to give a coated base. The resist 42 may be a metallic layer within which term is included compounds such as metal sulfides; the resist may be of organic materials such as wax, gum, resin, asphalt and the like. Certain organic films may be used and, according to some of the aspects of this invention, preferably are light-sensitive. The process to be followed from this point depends upon the nature of the resist 42.

Where the resist 42 of the coated base is a light-sensitive organic film, there is superposed thereon a master which is usually a transparent sheet 44 having opaque areas 46 with the opaque areas in direct contact with the resist 42 when the resist is to be exposed to light under conditions of contact printing. The process is not limited to contact printing but instead it is possible to print from a master on to the base coated with a light-sensitive resist by projection printing although the results thereby obtained will, of course, be subject to the inherent limitations of projection printing.

The opaque areas on the transparent sheet 44 which form the master define a pattern. The character of the pattern, i. e. whether scale markings, numerals, graduations, reticule marks or the like, depends upon the markings desired in the completed article. As illustrated in Fig. 6, light rays 48 are passed through the master except where they are cut off by the opaque areas 46 and act on the photo-sensitive resist 42 insolubilizing those areas reached by the light. These areas become hard and the areas unaffected retain their original solubility and there is produced a potential image 43 in the resist.

After exposure to light the base with the image in the resist is treated with a suitable developing solution which removes the resist in the areas which were not hardened by exposure to light to produce exposed areas of glass 50 which, with the resist still on the base, now forms a resist image 52. The resist image will comprise background areas defined by the residual resist and indicia usually in the form of graduations, numerals, or other symbols in exposed base areas according to the original pattern. The reverse arrangement is also contemplated for some fields.

The base with a resist image prepared according to this invention may be used to secure various types of markings either on the surface of the base or in the surface of the base, depending upon the characteristics required in the final product.

Proceeding according to one embodiment of the invention, the base with the resist image defined therein is subjected to molecular deposition in a vacuum to overlay a metallic film 54, Fig. 8, on the resist image, that is, over both the residual resist and the exposed areas of the base. Instead of applying a thin metallic film by molecular deposition in a vacuum, a film could be applied by precipitating silver, copper or other metal from solution. The metallic film applied in any of the ways described is in direct contact with the base at the exposed areas and is a relatively thin film as compared to the residual resist. After the metallic film 54 has been applied, the surface of the base is treated with a material, usually a solvent, which will dissolve away the residual resist but will not attack the metallic film deposited directly on the surface of the base. This produces the completed article comprising a metallic image 56 on the base 40, as shown in Fig. 9.

Where the base, as shown at 40, Fig. 10, has as a resist (analogous to the resist 42 of Fig. 4) a metallic layer, the metallic layer is engraved to form a metallic resist image 62, which includes exposed areas 64 of the base. The metal used as the resist and which forms the metallic resist image must be one having certain relative characteristics as compared to the metal used to form an overlay. A metal with suitable relative characteristics is applied as a thin film 66, Fig. 11, over the metallic resist image 62. After the metallic film has been applied in a manner to be described in greater detail hereinafter, the base with the metallic film is treated with a liquid which is a selective solvent for the metal of the metallic resist image, which solvent dissolves away the metallic resist image and the metal immediately overlaying, leaving the metallic image 66', originally deposited directly on the exposed areas 64 of the base 40, according to the pattern which had been engraved on the metallic resist.

The resist image on the base 40, illustrated in Fig. 7, instead of being subjected to the treatments illustrated in Figs. 8 and 9 or 11 and 12 to give surface markings, may be given a preliminary treatment before applying the metallic film over the resist image. More particularly, and referring to Fig. 13, the base 40 with the resist image which includes, of course, the exposed areas of the base where the resist has been removed, is subjected to the action of a material, usually a solution, which acts on the exposed areas of the base to produce what may be termed a frosted surface 68 characterized by microscopic pitting. Details of the character of the frosted surface 68 which produces images in the surface are illustrated in Fig. 18. Thereafter, one or more metallic films are applied over the resist image 52 to produce, when two metallic films are applied, an intermediate article of the type illustrated in Fig. 14 comprising the base 40, the resist image 52, the frosted surface 68, the first overlaying metallic film 70 and the second overlaying metallic film 71. In the manner previously described, the intermediate article of Fig. 14 is treated with a material which is a selective solvent for the resist image 52 and which removes the resist image 52 and both layers of metallic film 70 and 71 where the metallic films overlay the resist image, but the metallic films 70 and 71 are not removed from the frosted surface 68 and thereby produce a completed article having a bivisual metallic image comprising two metallic layers 70' and 71' in the surface of the base 40 overlaying the frosted surface 68.

In all instances it has been found that the acid or organic solvent works through the pores or edges of the metallic film which overlies the resist to remove the resist, together with the overlying portions of the film, so that the final result is as shown in Figs. 9, 12 or 15, where the precision image is formed by a film of metal directly adherent to the surface of the base.

Fig. 16 illustrates diagrammatically and in much enlarged cross-section, but not necessarily to scale, a marking produced in the more or less conventional method of mechanically engraving a wax resist, etching the surface exposed where the wax resist has been removed, and filling the cavity resulting from the etching action. The base 80, usually glass, was originally provided with the wax resist 82 shown in dotted lines. This wax resist was removed by an engraving operation to form the open space 84 and expose the surface of the base. When the base was subjected to the action of an etching material, either fumes of hydrofluoric acid or a solution of hydrofluoric acid, there was formed a cavity 86 which had a greater lateral dimension than the open space 84, originally cut in the resist by engraving. The cavity 86 had a relatively deep center and gradually tapered toward the surface of the base to form a relatively shallow cavity. This was filled with a suitable filler 88 which was opaque and also reflective of light rays impinging thereon from within the glass of the base 80. No matter how the filler 88 is applied to fill the cavity 86, it either will never fill the cavity completely or the sections at the edges of the cavity will be semi-opaque due to the thinness of filler at the extreme edges of the etched section. These edge areas 90 are translucent to light transmitted through the glass base 80 and are also reflective to internal rays of light reflected from these surfaces. The result of this is that the edge of the marking is indistinct and therefore unsuitable as an accurate indication for precision measurement. Furthermore, the transverse dimension of the marking created by the filler 88 is greater than that desired which was of the dimensions of the open space 84. Such effects are particularly serious where high precision is required for microscopic markings.

These disadvantages in obtaining accurate markings on bases are avoided when images are made according to the present invention.

Figure 17 shows in greatly enlarged section, and not necessarily to scale, a completed article such as those shown generally in Figs. 9 and 12, above. As shown in Fig. 17, the base 92 has on its surface 93 a layer 94 accurately deposited according to the desired pattern in the manner described generally above and more specifically hereinafter. This layer 94, usually metallic, if applied to a polished surface 93, will provide a reflective surface so that light rays 95 coming from the side edge of the optical element will be reflected as from the surface of a mirror in which the angle of incidence equals the angle of reflection and no edge light will be reflected at an angle substantially perpendicular to the surface 93. A marking formed by layer 94 will therefore be visible only when light is passed through the element or base 92 substantially perpendicular to the surface 93 wherein the areas covered by the metallic layer 94, being opaque, show up as black areas against the lighter background. The markings are also visible when viewed directly from the illuminated side.

Figure 18 illustrates in greatly enlarged section, but not necessarily to scale, markings in the surface of the base corresponding to completed articles of the type illustrated in Fig. 15. These optical elements may be considered bi-visual in the sense that the markings are visible in transmitted light and by reflected light. The glass or other transparent base 95, having a polished surface 96, has a marking defined by the frosted surface 97. As mentioned above, the frosted surface 97 is believed to be formed by microscopic pitting in the surface 96. The frosted surface 97, being very irregular, a ray of light 98 impinging on it would be reflected in substantially all directions and at least certain of the rays would be reflected substantially perpendicular to the surface 96 as at 99. Light rays 99 reflected from the entire surface 97 produce a marking which glows when laterally illuminated as by rays 98.

In order to increase the reflectivity from the frosted surface 97 and also in order that the marking may be opaque to transmitted light, a first layer of metal 100 is deposited on the frosted surface at a time when the polished surface 96 is protected by a resist, and in order to increase the abrasive strength another or second layer of metal 101 may be applied over the first layer of metal. Both the first and second layers of metal if applied by molecular deposition in a vacuum and particularly when applied by sputtering, as hereinafter described, will be extremely thin layers having excellent adhesion and it is even possible to clean surfaces 96 by polishing with rouge without damaging the metallic layers.

THE APPARATUS USED

Figures 19 and 20

Where a layer of metal is to be applied by sputtering, the apparatus shown diagrammatically in Fig. 19 may be used. Supported on the table 110 is a steel plate 112 serving as a base for the bell jar 114. Plate 112 communicates with the exhaust or suction pipe 115, which is connected to a mechanical vacuum pump 116, such as the "Megavac" type. An inlet valve 118 may be used to control the vacuum and to bleed oxygen or other atmosphere into the chamber.

The glass article 120 to be sputtered is conveniently supported by a glass plate 122 on beakers 124. One or more small dishes 126 containing mercury may be put in the bell jar, if it is desired to have the sputtering in a mercury atmosphere.

The plate 112 forms the anode of a circuit including the leads 128, to which a suitable direct current voltage, usually 6000 volts, is applied. Included in this circuit are resistors 130, conveniently three in number and in parallel, connected in series with a milliammeter 132, the fixed resistance serving to produce a varying voltage depending on the current flow. Readings of the milliammeter are an indication of the amount of vacuum present and may conveniently be used as a measure of the pressure in the system. The current is led to the bell jar through its connection to the conducting rod 134, conveniently aluminum, which passes through a bushing 136 in which it is engaged by set screw 138 for holding it in the desired position. The rod passes through an aluminum cap 140, suitable wax seals 141 being applied wherever necessary for airtight connections.

Rod 134 supports the cathode 142, which would be made of the metal or coated with the metal being sputtered onto the work 120.

Where the molecular deposition is by evaporation, the apparatus of Fig. 20 may be used. In this apparatus a bell jar 144 is supported on a steel plate 146. Plate 146 communicates with the exhaust or suction pipe 148, which is connected to an oil diffusion pump 150 which in turn is connected by reflux tube 152 and pipe 154 to a vacuum pump of known or standard design, indicated generally at 116, such as the "Megavac" type. Conducting posts 156 set airtight into the plate 146 support tungsten wires 158 for supplying the heat for vaporizing the metal, the metal to be vaporized being hung in small pieces onto the coils of the tungsten wire or being placed inside such coils, as is well understood in this art. The other ends of the coils 158 are supported by a ring member 160 which, in turn, is carried by a pipe 162 passing airtight through the plate 146 to connect with the suction pipe 148 of the air pumps 150 and 116. A cylindrical glass shield 164 may be provided. The work such as a glass plate 166 which is to receive the film of evaporated metal is placed face down on a stand or jig 168 which may be, if desired, supported by glass or insulating legs 170. Current for heating the tungsten filaments 158 is supplied through the leads 172 which are connected to a transformer 174 for supplying a relatively low heating voltage. Variable voltage is fed into the transformer 174 by the leads 176 from a variable transformer 178 supplied with the usual line voltage.

A disk 180, which may be of chromium or chromium plated, or a loop of aluminum wire, is positioned between the coils 158 and the work 166. Disk 180 is electrically connected to wire 128, which supplies a high potential, as does wire 128 in Fig. 19. Crystals of chromium may be placed in the coils 158, or pieces of wire made of the metal to be deposited, are hung on the coils. A Pirani or ionization gauge 182, the leads 184 which are connected to a suitable electrical instrument, is used for measuring the vacuum.

A low vacuum is first applied, of about $1/100$ mm. of mercury. At this point, a high potential is applied on plate 180, for about an hour. This creates a glow discharge, which serves to clean the work 166, although a little metal may be deposited. Then the pressure is decreased to $1/10,000$ mm. of mercury or less, which will extinguish the glow discharge. Without breaking the vacuum, current is applied to heat the coils 158 and to evaporate chromium, aluminum or other metal therefrom. The evaporation of the metal is completed in several minutes.

If the work that is being coated is of such form that the plate 180 would hinder the uniform deposition of the evaporated metal, the plate 180 may be moved out of the way after termination of the glow discharge and before evaporation is started, by a magnetic device not illustrated in Fig. 20.

THE METALS USED

In the formation of precision images of metal on a base by molecular deposition under vacuum onto the base, the coated base is photo-printed and developed, or engraved, to expose the pattern such as graduations of a scale. These graduations may be filled by molecular deposition under vacuum, of one or more metals, the term "molecular deposition" being used to cover the procedures of sputtering or evaporation.

Speaking generally, the image may consist of one or more metals applied by sputtering or by evaporation. Two metals may be used in succession, and either layer may be applied by sputtering or by evaporation. Alloys may be deposited, if desired, by simultaneously evaporating or sputtering two metals, as is already known in this art. The content of the alloy may be controlled by regulating the amount of metal released in the vacuum for molecular deposition.

In general, chromium, nickel and aluminum, alone or in combination, seem to give the best results. Excellent images have been produced by evaporated nickel, evaporated chromium, sputtered chromium, sputtered chromium overlaid with evaporated chromium, sputtered platinum, evaporated gold, sputtered gold, sputtered rhodium, sputtered chromium overlaid with evaporated aluminum, and evaporated gold overlaid with sputtered chromium. By way of illustration only, and not to restrict the invention thereto, the following metals and procedures give good results.

1. Chromium is applied by sputtering in an atmosphere of rarefied oxygen introduced at 118, Fig. 19. At first, a potential of about 1200 volts is used, at a pressure of about $1/10$ mm. of mercury. At this stage, very little chromium is deposited, but it is believed that any minute organic impurities that may be adhering to the clear glass are oxidized. After 2 hours of this treatment, the pressure is reduced to about $1/100$ mm. of mercury, and the voltage raised to about 2500 volts, under which condition the bulk of the chromium is deposited in a period of about 20 hrs.

2. Chromium is applied by sputtering below a chromium cathode at a potential of about 2000 to 4000 volts, the vacuum being such as to give a current density of 1 to 2 ma. per square inch of exposed chromium cathode. The operation is complete in about 20 hours.

3. Chromium is applied by sputtering for an hour at a pressure of about $1/100$ mm. of mercury. The pressure was then reduced to $1/10,000$ mm. of mercury or lower, and more chromium was applied by evaporation from hot tungsten filaments.

4. The glass base was subjected to a spark or glow discharge from an aluminum plate 180, Fig. 20 described above, while the jar was being exhausted, to clean the base. After the pressure had been reduced to $1/10,000$ mm. of mercury or lower, nickel was evaporated and deposited to form the image.

5. A layer of chromium is applied by sputtering at a pressure of about $1/100$ mm. of mercury. The pressure was reduced to $1/10,000$ mm. of mercury or lower and a layer of aluminum deposited by evaporation.

6. Sputtered platinum is applied to form the image, at a potential of about 2000 to 4000 volts, the vacuum being such, about $1/100$ mm. of mercury, as to give a current density of about 1 to 2 ma. per square inch of exposed platinum on the cathode.

7. Chromium is applied by sputtering, the operation beginning in an atmosphere of rarefied air and mercury vapor. The mercury vapor is released from open vessels of liquid mercury that are located inside of the vacuum chamber. Current is initially applied at a voltage of about 1200 volts to a system in which the total pressure is about $1/10$ mm. for a period of 2 hours. The pressure is then reduced to a value of about $1/1000$ mm. of mercury and the applied voltage is raised to a value of about 4000 volts, under which condition the bulk of the chromium is deposited in a period of 2 hours.

In place of producing a metallic image by evaporating or sputtering a metal onto the exposed glass surface, it is possible to secure a moderately permanent image by depositing lead sulfide, or silver, or copper out of a solution. Such images are not as permanent or tough as those that can be secured by metallic deposition in a vacuum, but precision images are formed that are extremely useful for certain purposes.

After the metal or metals have been applied over a resist image as described, the residual resist is removed by a suitable solvent therefor, which solvent seems to work through the metallic layer overlying the resist, so as to remove them both, leaving the desired image defined by metal adhering directly to the base.

PHOTO PRINTING METHOD

It is generally desirable to reproduce the desired pattern by photo-mechanical means, involving printing through a master pattern onto a photosensitive layer on the glass, rather than by the slower engraving process. More detailed procedures of the photo process are set forth in the following examples, by way of illustration, and not to restrict the invention thereto.

Example #1 of photo printing method

A piece of glass having a polished surface is immersed for approximately one hour in a cleaning solution consisting of a saturated solution of potassium dichromate in concentrated sulfuric acid. It is then washed with distilled water, dried, and the surface of the glass briefly heated in a Bunsen flame to remove any adhering or absorbed moisture. A photosensitive resist, of the type shown in the patents to Murray 2,091,715 or 2,169,003 for example, is whirled onto the surface of the glass, that is to say, the resist is applied in liquid form to the surface of the glass which is whirled in the plane of that surface in a centrifuge, which throws off excess fluid and gives a thin, uniform film. Films comprising artificial and natural gums and resins including ester gum, kauri gum, Congo gum, white resin, ether extracted asphalt, etc. may be used.

The resist is then exposed to ultra-violet light, for example, under a positive of the pattern which is to be reproduced, and the portions that have not been hardened by light are removed by a suitable developer. The resist image is now carefully washed free of impurities, and the work is then placed in the chamber where the metallic layer can be applied by evaporation or sputtering. Removal of the residual resist and the overlying metallic layer leaves only the metal layer as a metallic image on the areas of exposed base in the resist image.

The method of producing an image on glass taught by this invention has the additional advantage over etching the glass in that resists can be used which would normally be destroyed by the action of glass etching solutions containing hydrofluoric acid. By using a very thin film of resist, microscopically accurate reproductions can be secured.

Chromium is applied over the resist image by sputtering the work in an atmosphere of rarefied oxygen. Current is initially applied at a voltage of about 1200 volts to a system in which the pressure is about $\frac{1}{10}$ mm. of mercury. Very little chromium is sputtered during this initial process but some molecular bombardment takes place. It is believed that this bombardment, in the rarefied atmosphere of oxygen, serves to remove by oxidation any minute films of organic impurity that may remain on the bare glass of the exposed base. After about 2 hours of this treatment the pressure is lowered to a value of about $\frac{1}{100}$ mm. of mercury and the applied voltage is raised to a value of about 2500 volts, under which condition the bulk of the chromium is deposited in a period of 20 hours. The work is soaked and then swabbed with a mixture of toluol and ethyl acetate, which removes all resist remaining on the base along with the immediately overlying metallic deposit, leaving the metallic image on the base.

Example #2

A glass plate is cleaned, dried, and the surface held for a few moments in a Bunsen flame in the manner described above. A photosensitive resist, for example, the resist described in U. S. patent to Murray 2,091,715 is then applied by pouring it onto the glass surface while the glass is whirled at approximately 750 R. P. M. The resist is then allowed to dry in the dark for a period of several hours. When the dried photosensitive resist is exposed to light through a master pattern, the unexposed portions may be dissolved away by gently swabbing with a mixture of 5 parts of clear mineral oil and 3 parts of kerosene. Development is halted by washing the image with a solution of neutral soap and water, particular care being taken at this point to assure that no residues of film are present in the developed image.

When dry the glass plate is placed in the vacuum chamber, and the surface of the image subjected to a spark or glow discharge from an aluminum plate 180, Fig. 20, described above, while the chamber is being exhausted. This cleans the plate. After the absolute pressure reaches a value of below $\frac{1}{10,000}$ mm. of mercury, nickel is evaporated onto the exposed areas of the glass to form the desired image.

After completion of the molecular deposition of the nickel, the glass is immersed in a mixture of toluol and ethyl acetate, to gradually remove the resist along with the film of metal which overlies the resist. Evaporated nickel forms an exceedingly sharp and adherent image, which corresponds exactly with that of the master pattern.

Example #3

The resist described on p. 2, lines 20–25 of U. S. patent to Murray, 2,169,003 was applied to glass, dried, printed, developed, and washed in the manner described in Example #2.

The glass plate with the developed image was then placed face downward on a jig 168, Fig. 20, which maintained it in a horizontal position about 9 inches above the base plate of a vacuum chamber. Insulated helical coils 158 of tungsten wire, were positioned above the base of the vacuum plate, and a disk of chromium plated material 180 was interposed between the tungsten coils and the glass. A crystal of chromium was placed in each of the tungsten coils, and the apparatus was then covered with a vacuum bell jar.

Vacuum was now applied to the system until the pressure reached a value of $\frac{1}{100}$ mm. of mercury. At this point, chromium was sputtered onto the surface of the glass for a period of an hour, after which time the pressure was decreased to an absolute value of something less than $\frac{1}{10,000}$ mm. of mercury. The chromium plate 180 which had been used in the sputtering process was moved aside by magnetic means without disturbing the vacuum in the system. Chromium was then evaporated to overlay the sputtered chromium by heating the filaments 158 to incandescence. Care should be taken to avoid too rapid an evaporation of the chromium, which will result in the production of a non-adherent film.

The work was now soaked in ethyl acetate and toluol, which removed the resist and left a chromium pattern on the glass surface.

Example #4

A glass object was cleaned and dried as described above, and the following resist was applied to the surface of the glass in a whirler in the usual manner:

| | Grams |
|---|---|
| LePages photo-engraving glue | 81 |
| Distilled water | 113 |
| Ammonium dichromate | 7 |

The glass with the developed image was placed face upward on an insulated pedestal 124, Fig. 19, about 4 inches above the surface of a base plate 112. The vacuum bell jar was put in place, on the base plate, over the glass object, with a chromium plated disk 142 suspended through the neck of the bell jar. The disk was so located that with the bell jar in place, the surface of the disk was about 2 inches above the image. The system was then evacuated and a potential of something between 2000 and 4000 volts was impressed on the system, the chromium plate being made negative to the grounded base plate. The absolute pressure on the system was then adjusted and maintained at a value that would result in a current flow of 1 to 2 milliamperes per square inch of exposed area of chromium plate. During the sputtering process the bell jar was cooled with an electric fan. Sputtering was continued for a period of 20 hours to produce an opaque image. The coated article is now removed from the bell jar, and the resist, together with all chromium overlying the resist, were removed by immersion in hot alkali solution, leaving the desired image of chromium on the clean glass surface.

*Example #5*

A piece of clear glass was cleaned, dried, and the following resist was then applied to the surface of the glass in the whirler:

Ether extracted Egyptian asphaltum___grams__ 15
Benzol _____do____ 50
Oil of lavender_____drops__ 3

The resist was dried, light exposed under the desired pattern, and then developed by swabbing off the unexposed areas with a cotton swab that was wetted with turpentine. The development was checked, and the unexposed areas were freed of residues of film by washing the image with neutral soap and water. The work was now placed in a vacuum chamber, and the surface of the image was sputtered with chromium from a plate 180, Fig. 20, while under a vacuum of about $1/100$ mm. of mercury. The vacuum was then reduced to about $1/10,000$ mm. of mercury, and aluminum was evaporated from coils 158 onto the work to produce a film with the desired opacity.

The work was now soaked in toluol, which removed the resist, leaving the desired image of sputtered chromium overlaid with aluminum.

*Example #6*

A clear piece of glass was cleaned and dried, and the following resist was applied to the surface of the resist in a whirler:

|  | Grams |
| --- | --- |
| Betanaphthlamine | 20 |
| Furfural | 10 |
| Toluol | 50 |
| Iodoform | 10 |

The resist was dried, printed under the desired pattern, and then developed by swabbing with cotton wetted with turpentine. The dried image was then placed in a vacuum chamber and a procedure similar to that employed in Example #4 was used to sputter platinum onto the exposed areas of the glass. After the sputtering process was complete, the work was soaked in ethyl acetate, which removed the resist to leave the desired image in platinum on glass.

MECHANICAL ENGRAVING METHOD

In this method, the resist or background is engraved mechanically by cutting through the resist, to expose the pattern in clear glass. This is preferably done with a reducing pantograph, from a large master pattern, giving a pattern of great accuracy. Metal is then sputtered or evaporated or both onto the article, and the remainder of the resist, and its overlying film, are removed by a suitable solvent.

The article thus produced may be used as a master pattern in the photo-printing method already described.

To explain the process in more detail, the glass after it has been cleaned, washed, dried, and briefly heated in a Bunsen flame is placed in an enclosure in which is located a tungsten filament that can be heated to incandescence by electrical means. The filament is conveniently wound in the form of a helix to hold a small amount of the metal that is to be evaporated. The enclosure is then evacuated. After the absolute pressure in the enclosure is at a pressure of $10^{-4}$ mm. of mercury, or lower, a mirror is formed on the glass surface by evaporation of a metal that can subsequently be dissolved by the action of an acid. Zinc, copper, tin, cadmium, indium, and antimony sulfide have been used, in general, zinc, nickel and copper giving the best results. Although the methods described have given metallic films which can be subsequently engraved with accuracy, the method of the production of the metallic film is by no means limited to films produced in the above manner. Films produced by sputtering the desired metal under the action of a high potential and a reduced atmosphere may be employed, and in a limited number of cases a thin mirror of silver, deposited in the usual manner, may be employed.

Although the use of a metallic film as above described for the resist is preferred for mechanical engraving, other resists that would take the engraving with accuracy could be used.

The metallic film or resist is now engraved with the desired pattern, as by a reducing pantograph from a very accurate larger master pattern. By reason of the thinness of the metallic film, finer lines can be engraved than is possible with the usual type of wax resist. Furthermore, the resist image being present in the form of a metal will allow the subsequent operation to be made without destroying the accuracy by deformation of the image by heat which is evolved in the sputtering or evaporating process, a very serious limitation where wax resists are employed.

The metal which is to form the final image is now applied to the glass by a process of sputtering or evaporating the metal in an evacuated chamber. Sputtered chromium gives an exceptionally adherent and permanent film, but the process is by no means limited to the use of sputtered chromium. Excellent images have been produced by evaporated nickel, evaporated chromium, sputtered chromium overlaid with evaporated chromium, sputtered platinum, evaporated gold, and sputtered rhodium.

After the evaporating or sputtering process is complete, the work is placed in an acid solution which will attack the underlying resist metal without attacking the metal that is to form the final image. It has been found that the acid will seep under the acid resistant metallic film to attack the underlying acid soluble resist, leaving the desired image adherent to the glass base at those points where it was directly applied thereto.

Of the images described in the foregoing, it has been found that sputtered chromium, sputtered chromium overlaid with evaporated chromium, and evaporated nickel give the most adherent images. As resists, zinc and copper have in general gives the best results. An example of this method of producing a positive metallic image on glass follows.

*Example of mechanical engraving method*

A clear piece of glass was cleaned, dried and then briefly subjected to the action of the flame of a Bunsen burner. It was then placed in a chamber and subjected to a spark discharge from an aluminum plate as the surrounding space was evacuated. When the vacuum had reached a pressure of less than 1/10,000 mm. of mercury, zinc was evaporated onto the surface of the glass to form the resist. The zinc must be evaporated with care, precautions being taken to prevent too rapid an evaporation of the zinc. Semi-opaque films have generally been found to be the most effective.

The zinc resist film was then engraved according to the desired pattern. The glass with the engraved image was now placed in a vacuum chamber, and a film of sputtered chromium deposited over the entire surface of the work. After the sputtering process was complete, the work was immersed in a solution of dilute hydrochloric acid. This removed the zinc resist from all portions of the glass surface along with the chromium that had been deposited on top of the zinc. The chromium that had been deposited directly on the glass according to the engraved image adhered very firmly to form the desired image on a clear glass surface.

It has been observed that sputtered chromium on glass is passive and will resist the action of acids that could normally be used to dissolve chromium metal. The image so formed will resist tarnishing and corrosion by any ingredients present in the atmosphere, and it will also resist the action of acid and basic solutions for prolonged periods of time.

MAKING PRECISION IMAGES ON GLASS, VISIBLE BY TRANSVERSE ILLUMINATION, SUCH AS RETICULES

In certain types of optical instruments, for example in the stereoscopic type of range finder, an essential part of the instrument is a set of reticules. Each of these devices consists of a glass lens on one surface of which is engraved a minute but extremely precise design. It must be possible to view these designs as opaque areas, but in addition, where the instrument is to be used at night the opaque areas must be visible in the optical system of the instrument when transversely illuminated. For example, if the instrument is used during darkness, then transverse illumination of the reticule should make the pattern of the reticule markings appear as a bright design on an otherwise dark field. It is also highly desirable in the interests of accuracy that the edges of the pattern be clean cut and sharp.

Reticules have heretofore been made by accurately engracing a wax resist with a needle that is actuated by a delicate pantograph; after the design is cut into the wax, the glass is etched with hydrofluoric acid, the wax is removed, and the etched design is filled with a pigmented material.

In the process of the present invention, the glass surface is cleaned and then covered with a film of a light sensitive resist. The light sensitive film is then exposed to light through a pattern of the design that is to be duplicated. The light will harden all of the exposed portions of the resist. The design is developed by washing away the resist at those portions that have not been hardened or rendered insoluble by exposure to light, to form a resist image, all as explained in the earlier part of this specification. The design may now be inspected microscopically. If be cleaned and the foregoing process repeated without regrinding or repolishing of the glass surface. Minor defects, such as "pin holes" can oftentimes be touched up with a resist applied by a sharply pointed tool, while the resist film is examined under a microscope. In some cases after the resist has been developed by removing portions according to the pattern through which it was exposed, the film of resist is further hardened by direct extended exposure to light.

Instead of forming the resist image by photoprinting and developing, the resist image may be formed by mechanically engraving a suitable resist.

In contradistinction to the methods described above for making precision images, reticules, and scales which require opacity only, and where it is desired to have the pattern appear bright or glow against a background, the resist image is treated with a solution that "frosts" the surface of the glass without producing any appreciable depth of etching. The solution used for this purpose must be formulated with care, since the usual etching methods and solutions will destroy the delicate film that overlays those portions of the glass that must remain unaffected. It is also important that the etching fluid shall not eat into the glass surface in the manner of a common etching fluid, which would produce an indented line and also a broadened line, the latter effect making for an image which will not be as sharp as is desired. When cathodic disintegration or sputtering takes place, the entire surface will be covered with a metallic deposit, but the metal will adhere only to the frosted design, the remainder of the surface being shielded with the resist.

We have discovered that certain metals when deposited on the frosted surface will give the same a lustrous or "glowing" appearance from the rear when illuminated by transverse illumination, as in a reticule. Gold is preferred for this purpose, although silver may be used. It is also possible to deposit these same metals and others, including aluminum, on the frosted surface by evaporation. All of the above mentioned metals, when deposited on a frosted surface, produce a line that will disperse light, a feature clearly visible by transverse illumination. However, these metals are soft, particularly gold, which we prefer using, and a frosted pattern partially filled with gold can be easily damaged by rubbing the surface of the glass. We have therefore found it desirable to cover the gold with an overlying deposit of sputtered chromium, thereby increasing the opacity of the image and also providing a hard metallic overcoat that will make it difficult to injure the image by rubbing the surface of the glass.

Where the two metals are to be sputtered onto the frosted design, we have found that increased adherence of the image is secured if the two processes be made a continuous operation without breaking the vacuum in the apparatus. Another advantage secured with continuous operation is that the resist film that shields the bulk of the glass surface is less liable to rupture than is the case where the metals are deposited in separate operations.

After the frosting process is completed, the article is placed in a bell jar 200, Fig. 21. Inside of the bell jar may be located one, but preferably there are two, cathodic metal surfaces, disk 202 and ring 204. These surfaces are highly insulated Cathode plate 202 may be of brass coated with gold. It is connected by a wedge 208 with a lead in wire 210, encased in a glass rod 212 passing airtight through the base plate 206. Cathode ring 204 which may be plated with chromium, is suspended by wire 214 from rod 216 which passes out of the jar through the airtight seal 218. Current may be selectively applied to the leads 210 and 216 to cause one or both cathodes to be disintegrated by direct current when vacuum is applied.

Metallic disintegration of the cathode may advantageously be done with the cathode at a negative potential of something between 2000 and 4000 volts with respect to the metallic base plate, which serves as the anode. The vacuum is adjusted to the point where a continuous flow of current is secured and a glow discharge is produced, but where a further bettering of the vacuum will cause disruption of the flow of current. The article 220 is placed face up about midway between the cathode that is to be disintegrated and the base plate, preferably supported on an insulating surface such as a glass disk 222.

All exposed metallic surfaces inside of the bell jar are aluminum, with the exception of the base plate 206 and the gold and the chromium surfaces 202 and 204 that comprise the surfaces that are to be disintegrated. The prepared article 220 with the resist still intact, is placed face upwards in the apparatus, and evacuation of the same is started. As soon as a continuous current flow can take place through the whole of the gas space a negative potential of about 3000 volts is applied to rod 216. This discharge will tend to clean minute dirt inclusions off of the surface of the article. As soon as the vacuum is sufficiently lowered to permit cathodic disintegration to take place, the negative potential of about 3000 volts is disengaged from 216 and is applied to wire 210 and so to gold cathode 202. The amount of gold that is deposited can be quite accurately controlled by observing the opacity imparted to the glass supporting plate. When this is sufficiently opaque, the negative potential of about 3000 volts is transferred from 210 back to 216, and chromium is sputtered from 204 over the whole until the desired opacity is secured. The process is now complete, and the surface of the glass can be cleaned to remove the resists and any metal deposited on the resist. Polishing with a little rouge does not remove the image of the desired pattern which is extremely adherent and can be viewed both with direct and with transverse illumination.

Another method of applying a layer of gold followed by a layer of chromium by a continuous operation in the same vacuum is the following. A plate containing a heavy electro-deposit of chromium is coated with gold by any means available for molecular deposition. Either evaporation or cathodic disintegration under vacuum is usually preferred because in practicing the procedures herein described, the apparatus disclosed would be available. The article that is to be coated is then placed beneath the composite chromium-gold cathode, the system is placed under vacuum, and since gold has a much higher deposition rate than the chromium, gold is the first metal deposited on the frosted glass by cathodic disintegration. After cathodic disintegration has used up the gold, the underlying chromium will be deposited in the same operation. It is obvious that the thickness of the gold deposit on the glass can be controlled by limiting the amount originally deposited on the chromium surface.

We have also been able to secure satisfactory results by first evaporating gold onto the frosted design, followed by a layer of sputtered chromium. Good results have also been secured by sputtering gold onto the frosted design, breaking the vacuum, transferring the work to another apparatus, followed by coating with sputtered chromium. Both of these methods can produce good results, but we have found that they are less reliable than the methods which coat the work in a single process without breaking of the vacuum.

The following formula is effective as a light sensitive resist. Exceedingly fine images can be produced therewith, and the light hardened film is resistant to the etching fluids that are advantageously used.

*Formula #1*

|  | Grams |
|---|---|
| Dicinnamalacetone | 4 |
| Bakelite B. R. 11504 | 12 |
| Methyl ethyl ketone | 40 |
| Toluol | 40 |
| Benzyl alcohol | 1.0 |
| Methyl violet | 0.2 |
| "Halowax" #1000 | 1.0 |

Other formulae for light sensitive materials as set forth in the Murray patents may also be used.

After the solution is prepared, it is aged over night, filtered in the morning, and poured onto a glass surface while the glass is being rotated at about 800 R. P. M.

The coated surface is preferably dried overnight in a dust shielded compartment, after which it is ready to be exposed under the desired pattern to light radiation from a high intensity quartz tube. After exposure to light, the unexposed portions of the resist are removed by sponging with the following solution:

*Formula #2*

5 parts clear mineral oil
3 parts kerosene

The developed image is now visible, and residues of oil can be removed from the prepared surface and from the developed image by gently sponging the whole with a water solution of neutral soap. A concentrated solution of a wetting agent such as "Aerosol OT" has been found to be very effective for this purpose. The developed image may be immediately frosted and coated with metal, or the image may be set aside for a period of as long as one or two weeks and then frosted and coated with metal. It is usually preferable to re-expose the developed film to increase its hardness and resistance.

Frosting formulae that have proved to be effective, including our preferred formulation 3A are:

*Formula 3A*

|  | Grams |
|---|---|
| Ammonium bifluoride | 10 |
| Oxalic acid | 15 |
| Potassium hydroxide | 14 |
| Sulfuric acid | 4 |
| Dextrose | 14 |
| Water | 200 |

Formula 3B

| | Grams |
|---|---|
| Ammonium silico fluoride | 2.5 |
| Ammonium bifluoride | 2.5 |
| Potassium hydroxide | 7 |
| Sulfuric acid | 2 |
| Water | 50 |

Example 3C

| | Grams |
|---|---|
| Ammonium fluoride | 5 |
| Sulfamic acid | 7 |
| Potassium hydroxide | 7 |
| Sulfuric acid | 2 |
| Water | 50 |

Before applying the frosting solution, the work is inspected with a microscope and any pinholes in the resist are touched up with an asphaltum paint. The paint is also applied to the rear of the glass and to all surfaces that might be subjected to the solution, with the exception of the area that contains the developed image. After the paint is dry, the whole glass is dipped for a period of 30 seconds in one of the above frosting solutions. A frosting is produced in the surface of the glass without producing an appreciable depth of etch.

We find that we are unable to use etching solutions of the nature commonly employed with wax resists, as these immediately destroy the resist. The same is true of fumes of hydrofluoric acid gas, which will destroy the resist in a fraction of a second.

The surface prepared in the foregoing manner is washed with water and the frosted areas are coated with a thin film of gold, followed by a heavier deposit of chromium, as described in the foregoing portion of the specification.

Gold has been used as illustrative of a bright metal that is effective as a deposit directly on a frosted glass surface, giving to that surface a light dispersing character that will make it visible when viewed with transverse illumination. However, other metals that will produce bright mirror surfaces may be used in place of the gold, the two which find most common use being silver or aluminum. It should be noted that aluminum cannot be effectively sputtered, but must be applied by evaporation under vacuum.

We have used the reticule of a range finder as an illustration of a pertinent use for this process. However, the process is by no means limited to this use, and can find application wherever a precision design on glass that can be viewed with direct or transverse illumination is desired.

For a discussion of the paths of light in an article to be viewed by transverse illumination, see the description above of Figures 2, 2a and 18.

While we have described in detail certain specific embodiments of our invention, it should be understood that the disclosure is illustrative, rather than restrictive, of the invention, and that it may be carried out in other ways.

We claim as our invention:

1. The method for producing precision images on a transparent base, comprising the steps of applying a first relatively soft metal to a surface of the base to form a metallic film resist, forming a resist image by removing portions of said resist to expose said surface according to a predetermined pattern, applying a second different harder metal to the resist image and the exposed surface of the base to form a substantially opaque metallic film, and removing the residual resist metal and its overlaid second metallic film without removing the substantially opaque metallic film applied directly on the base.

2. The method for producing precision images on a transparent base, comprising the steps of applying a relatively soft metallic film as a resist to a surface of the base, forming a resist image by removing portions of said resist to expose the said surface according to a predetermined pattern, applying a substantially opaque metallic film of a relatively harder metal by molecular deposition under vacuum to the resist image and the exposed surface of the base, and removing the residual resist and its overlaid substantially opaque metallic film without removing the substantially opaque film applied directly on the base.

3. The method for producing precision images on a transparent base, comprising the steps of applying a first relatively soft chemically reactive metal to a surface of the base to form a metallic film resist, forming a resist image by removing portions of said resist to expose said surface according to a predetermined pattern, applying a second different metal which has good abrasion resistance and adhesion to glass to the resist image and the exposed surface of the base to form a substantially opaque metallic film and treating said surface with a chemical reagent which reacts with the resist metal to remove the residual resist metal and its overlaid second metallic film without removing the substantially opaque metallic film applied directly on the base.

4. The method for producing precision images on a glass base, comprising the steps of applying a relatively soft metallic film as a resist directly to a surface of the base, forming a resist image by removing portions of said resist to expose said surface according to a predetermined pattern, applying an opaque film of a different metal to the resist image and the exposed surface of the base, and removing the residual resist and its overlaid substantially opaque film without removing the substantially opaque film applied directly on the base.

5. The method for producing precision images on a transparent base, comprising the steps of applying a relatively soft metallic film as a resist to a surface of the base, forming a resist image by removing portions of said resist to expose said surface according to a predetermined pattern, applying a substantially opaque film of a different metal to the resist image and the exposed surface of the base, and treating the resist image with a solvent for removing the residual resist and its overlaid substantially opaque film without removing the substantially opaque film applied directly on the base.

6. The method of making precision images in metal on glass, comprising the steps of applying a relatively soft metallic film as a resist to the surface of a glass base, forming a resist image by removing portions of said resist to expose said surface according to a predetermined pattern, to define the pattern in clear glass, applying a substantially opaque metallic film of a different metal to the resist image and the exposed surface of the base by molecular deposition under vacuum and removing the residual resist and its overlaid metallic film without removing the substantially opaque film applied directly to the glass.

7. The method of making precision images in metal on glass, comprising the steps of applying a relatively soft metallic film as a resist to the surface of a glass base, forming a resist image by removing portions of said resist to expose said surface according to a predetermined pattern, to define the pattern in clear glass, applying a substantially opaque metallic film of a different metal to the resist image and the exposed surface of the base by sputtering under vacuum and removing the residual resist and its overlaid metallic film without removing the substantially opaque film applied directly to the glass.

8. The method of making precision images in metal on glass, comprising the steps of applying a relatively soft metallic film as a resist to the surface of a glass base, forming a resist image by removing portions of said resist to expose said surface according to a predetermined pattern, to define the pattern in clear glass, applying a substantially opaque metallic film of a different metal to the resist image and the exposed surface of the base by evaporation under vacuum and removing the residual resist and its overlaid metallic film without removing the substantially opaque film applied directly to the glass.

9. The method for producing precision images on a transparent base, comprising the steps of applying a relatively soft metallic film as a resist to a surface of the base, forming a resist image by mechanically removing portions of said resist by cutting through said resist to expose said surface according to a predetermined pattern, applying a substantially opaque metallic film of a different metal to the resist image and the exposed surface of the base, and removing the residual resist and its overlaid metallic film without removing the substantially opaque film applied directly to the base.

10. The method for producing precision images on a transparent base, comprising the steps of applying a relatively soft metallic film as a resist to a surface of the base, forming a resist image by mechanically removing portions of said resist by cutting through said resist to expose said surface according to a predetermined pattern, applying a substantially opaque metallic film of a different metal to the resist image and the exposed surface of the base by molecular deposition under vacuum, and removing the residual resist and its overlaid metallic film without removing the substantially opaque film applied directly to the base.

11. The method for producing precision images on a transparent base, comprising the steps of applying a relatively soft metallic film as a resist to a surface of the base, forming a resist image by mechanically removing portions of said resist by cutting through said resist to expose said surface according to a predetermined pattern, applying a substantially opaque metallic film of a different metal to the resist image and the exposed surface of the base by sputtering under vacuum, and removing the residual resist and its overlaid metallic film without removing the substantially opaque film applied directly to the base.

12. The method for producing precision images on a transparent base, comprising the steps of applying a relatively soft metallic film as a resist to a surface of the base, forming a resist image by mechanically removing portions of said resist by cutting through said resist to expose said surface according to a predetermined pattern, applying a substantially opaque metallic film of a different metal to the resist image and the exposed surface of the base by evaporating under vacuum, and removing the residual resist and its overlaid metallic film without removing the substantially opaque film applied directly to the base.

13. The method for producing precision images on a transparent base, comprising the steps of applying a relatively soft metallic film as a resist to a surface of the base, forming a resist image by mechanically removing portions of said resist by cutting through said resist to expose said surface according to a predetermined pattern, applying a substantially opaque metallic film of at least one different metal to the resist image and the exposed surface of the base by sputtering and evaporating in the same vacuum, and removing the residual resist and its overlaid metallic film without removing the substantially opaque film applied directly to the base.

14. The method for producing precision images on a transparent base, comprising the steps of applying a relatively soft metallic film as a soluble resist to a surface of the base, forming a resist image by mechanically removing portions of said resist by cutting through said resist to expose said surface according to a predetermined pattern, applying a substantially opaque metallic film of a different metal to the resist image and the exposed surface of the base, and removing the residual resist and its overlaid metallic film by the use of a solvent without removing the substantially opaque film applied directly to the base.

15. The method for producing precision images on a glass base, comprising the steps of applying a relatively soft metallic film as a resist to a surface of the base, forming a resist image by mechanically removing portions of said resist by cutting through said resist to expose said surface according to a predetermined pattern, applying a substantially opaque metallic film of a different metal to the resist image and the exposed surface of the base, and removing the residual resist and its overlaid metallic film without removing the substantially opaque film applied directly to the base.

16. The method of making precision images in metal on glass, comprising the steps of applying a relative soft metallic film as a soluble resist on a glass base, engraving said resist to form a resist image, applying a substantially opaque metallic film of a different metal to the resist image and the exposed surface of the base, by molecular deposition under vacuum, and removing the residual resist and its overlaid metallic film by treatment with a suitable solvent, without removing the substantially opaque film applied directly to the base.

17. The method of making precision images in metal on glass, comprising the steps of applying a relatively soft metallic film as a soluble resist on a glass base, engraving said resist to form a resist image, applying a substantially opaque metallic film of at least one different metal to the resist image and the exposed surface of the base by sputtering and evaporation in the same vacuum, and removing the residual resist and its overlaid metallic film by treatment with a suitable solvent, without removing the substantially opaque film applied directly to the base.

18. The method of making precision images in metal on glass, comprising the steps of applying a relatively soft metallic film as a soluble resist on a glass base, engraving said resist to form a resist image, applying a substantially opaque metallic film to the resist image and the exposed surface of the base by sputtering a different metal and evaporating a metal in the same vacuum, and removing the residual resist and its overlaid metallic film by treatment with a suitable solvent, without removing the substantially opaque film applied directly to the base.

19. The method for producing precision images on a transparency base, comprising the steps of applying a relatively soft metallic film resist directly on the surface of the base, forming a resist image by mechanically engraving said resist to expose said surface according to a predetermined pattern, microscopically pitting the exposed surface of the base, applying a substantially opaque film of a different metal to the resist image and the exposed surface of the base, and removing the residual resist and its overlaid substantially opaque film without removing the substantially opaque film applied to the microscopically pitted pattern.

20. The method for producing precision images on a transparent base, comprising the steps of applying a relatively soft metallic film resist directly on the surface of the base, forming a resist image by mechanically engraving said resist to expose said surface according to a predetermined pattern, microscopically pitting the exposed surface of the base, applying a substantially opaque metallic film of a different metal by molecular deposition under vacuum to the resist image and the exposed surface of the transparent base, and removing the residual resist and its overlaid substantially opaque film without removing the substantially opaque film applied to the microscopically pitted pattern.

ALLAN R. A. BEEBER.
DAVID D. JACOBUS.
CARL W. KEUFFEL.

REFERENCES CITED

The following references are of record in the file of this patent:

UNITED STATES PATENTS

| Number | Name | Date |
|---|---|---|
| 154,032 | Frederici | Aug. 11, 1874 |
| 1,857,929 | McFarland | May 10, 1932 |
| 1,994,483 | Ott | May 19, 1935 |
| 2,204,147 | Murray | June 11, 1940 |
| 2,239,452 | Williams et al. | Apr. 22, 1941 |
| 2,279,567 | Holman | Apr. 14, 1942 |
| 2,332,003 | New | Oct. 19, 1943 |
| 2,447,836 | Beeber et al. | Aug. 24, 1948 |

OTHER REFERENCES

Scientific American, page 115, Aug. 1936, "Science lays a Ghost."